United States Patent
Aliesch (10) Patent No.: US 9,694,983 B2
(45) Date of Patent: Jul. 4, 2017

(54) CONVEYING DEVICE WITH AN EXTENSIVELY EXTENDED CONVEYING ELEMENT

(71) Applicant: WRH WALTER REIST HOLDING AG, Ermatingen (CH)

(72) Inventor: Robert Aliesch, Gross (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 14/911,184

(22) PCT Filed: Aug. 8, 2014

(86) PCT No.: PCT/CH2014/000117
§ 371 (c)(1),
(2) Date: Feb. 9, 2016

(87) PCT Pub. No.: WO2015/021567
PCT Pub. Date: Feb. 19, 2015

(65) Prior Publication Data
US 2016/0207712 A1    Jul. 21, 2016

(30) Foreign Application Priority Data

Aug. 12, 2013   (CH) ...................................... 1383/13

(51) Int. Cl.
*B65G 23/16*     (2006.01)
*B66B 23/02*     (2006.01)
(Continued)

(52) U.S. Cl.
CPC ............. *B65G 23/16* (2013.01); *B65G 17/02* (2013.01); *B65G 17/06* (2013.01); *B65G 23/14* (2013.01);
(Continued)

(58) Field of Classification Search
CPC ........ B65G 23/16; B65G 17/02; B65G 17/06; B65G 23/36; B65G 23/14; B66B 21/10; B66B 23/028; B66B 23/02; B66B 23/08
(Continued)

(56) References Cited

U.S. PATENT DOCUMENTS 3,365,051 A * 1/1968 Mullis ..................... B66B 23/02
198/330
3,677,388 A * 7/1972 Boltrek ................... B66B 23/02
198/330
(Continued)

FOREIGN PATENT DOCUMENTS

CA    2 238 540    11/1999
DE    1 060 782    7/1959
(Continued)

OTHER PUBLICATIONS

Switzerland Search Report dated Feb. 12, 2013, Application No. CH 01383/13.

*Primary Examiner* — Mark A Deuble
(74) *Attorney, Agent, or Firm* — Rankin, Hill & Clark LLP (57) ABSTRACT

A conveying device with an extensively extended conveying element that is led in a revolving manner along a conveying direction, is deflected at the head-ends of the conveying device and is laterally enclosed by side closure beams. The conveying device includes a drive device with a drive motor to drive the conveying element. The drive device is arranged between the two head-ends, between the side closure beams, and between the upper conveying section and the lower return section of the conveying element. The drive device includes a drive element that is arranged in a revolving manner about two deflection pivots spaced from one another in the conveying direction, and is driven by the drive motor. The drive element supports the upper conveying section of (Continued)

the conveying element, which is arranged at the top, and with this forms a contact fit for transmitting a drive force onto the conveying element.

15 Claims, 8 Drawing Sheets

(51) Int. Cl.
  *B65G 23/14* (2006.01)
  *B65G 17/02* (2006.01)
  *B65G 23/36* (2006.01)
  *B65G 17/06* (2006.01)
  *B66B 21/10* (2006.01)

(52) U.S. Cl.
  CPC .............. *B65G 23/36* (2013.01); *B66B 21/10* (2013.01); *B66B 23/028* (2013.01)

(58) Field of Classification Search
  USPC .......................................................... 198/833
  See application file for complete search history.

(56) References Cited

U.S. PATENT DOCUMENTS

| | | |
|---|---|---|
| 3,967,720 A | 7/1976 | Arieh |
| 3,994,390 A | 11/1976 | Peterson, Jr. et al. |
| 4,535,880 A | 8/1985 | Boltrek |
| 5,088,920 A * | 2/1992 | Reunamaki ............ B65G 23/16 432/236 |
| 6,457,573 B1 * | 10/2002 | Ostermeier ............. B66B 23/02 198/330 |
| 7,168,547 B2 * | 1/2007 | Thaler .................... B66B 23/028 198/322 |
| 2006/0011450 A1 * | 1/2006 | Fargo ...................... B66B 23/02 198/330 |
| 2006/0137960 A1 * | 6/2006 | Fargo .................... B66B 23/028 198/330 |
| 2006/0144672 A1 * | 7/2006 | Thaler .................... B66B 23/02 198/326 |
| 2008/0053788 A1 * | 3/2008 | Ishikawa ................ B66B 23/02 198/330 |
| 2008/0164119 A1 * | 7/2008 | Gonzalez Alemany ............... B66B 21/12 198/325 |
| 2009/0139830 A1 * | 6/2009 | Gonzalez Alemany .............. B66B 23/028 198/321 |
| 2011/0073444 A1 | 3/2011 | Wunsch |

FOREIGN PATENT DOCUMENTS

| | | |
|---|---|---|
| DE | 1 887 279 | 2/1964 |
| DE | 25 26 552 | 1/1976 |
| DE | 93 16 012 | 1/1994 |
| DE | 44 07 163 | 6/1995 |
| DE | 10 2006 010 974 | 9/2007 |
| EP | 2 105 392 | 3/2009 |
| JP | 55-40185 | 3/1980 |
| JP | 63-173173 | 11/1988 |
| JP | 11-49327 | 2/1999 |
| WO | 2010/148523 | 12/2010 |
| WO | 2013/016833 | 2/2013 |

* cited by examiner

CONVEYING DEVICE WITH AN EXTENSIVELY EXTENDED CONVEYING ELEMENT

BACKGROUND OF THE INVENTION

Field of the Invention

The invention lies in the field of conveying technology and relates to a conveying device, including:

two side closure beams that are spaced from one another and run along a conveying direction, an extensively extended conveying element, which is arranged in a circulating manner between the side closure beams and is with an upper conveying section and with a lower return section, two head-ends, which are spaced from one another in the conveying direction, wherein the conveying element is deflected at the head-ends in each case, a support arrangement arranged between the side closure beams and the head-ends, for supporting the conveying section, at least one drive device with at least one drive motor for the drive of the conveying element.

Description of Related Art

Conveying devices with a circulating, extensively extended conveying element, such as a conveying belt or mat chain, are known in the state of the art. The convening elements as a rule are driven at one or two deflection locations by way of a deflection shaft.

The conveying element is guided between the deflection locations is a sliding manner, e.g. on slide rails, for the support of the conveying element in the region of the upper conveying section, on which the conveyed article lies.

Conveying devices, with which conveying element rolls between the deflection locations on roller bodies are also known. Such a conveying device is disclosed, e.g., in WO 2010/148523.

The mentioned conveying devices are applied, for example, as worker-rider belts. The construction height of such worker-rider belts should be as low as possible. Thus conveying devices, which for the mentioned application have a construction height of maximal 120 mm to 170 mm, are common nowadays. With regard to this dimensional detail, the free height between the floor support and the return section of the conveying element is also included. However, the comparatively low construction height represents a particular challenge, especially concerning the design and configuration of the drive device.

DE-C-44 07 163 describes a generic conveying device with a conveying belt that circulates around two deflection pivots. The conveying belt is driven via one of the deflection pivots, wherein the drive moor is arranged outside the driven conveying belt. The deflection pivot is driven via a gear by a chain drive.

Although a drive device, which is arranged outside the conveying region, permits a reduced construction height of the conveying device for that region that forms the conveying surface, such a conveying device however is neither compact nor space-saving. A compact and space-saving construction manner necessitates the drive units with the drive motor and gear being arranged between the conveying section and return section of the conveying element as well as between the side closure beams.

DE-U-93 16 012 likewise concerns itself with the problem of restricted space between the conveying section and deflection section of the conveying belt of a conveying device, which is led in a circulating manner. The conveying belt wraps a drive wheel in the deflection section. The drive motor is arranged between the conveying section and return section of the conveying element as well as between the side closure beams. For reasons of space, the drive shaft of the drive unit is at right angles to the rotation axis of the drive wheel. The torque transmission is effected via a gearing with a bevel gear. The conveying belt between the deflection regions is guided in a sliding manner via sidewalls.

DE 1 887 279 describes a generic conveying device with a circulating, extensively extended conveying element, which is driven via a deflection pivot. The drive motor is arranged between the two deflection regions within the conveying device, wherein the device includes a gear with drive belts for transmitting the torque from the motor shaft onto the driven deflection pivot.

DE 1 060 782 also describes a generic conveying device with a circulating, extensively extended conveying element, which is led via two deflection locations that are spaced from one another. The conveying element here, in contrast to the solutions described above, is not driven in the region of the deflection, but in the region of the conveying and return section, via a positive connection in each case to a drive element. The drive elements are driven by a drive motor that is arranged between the deflection locations within the conveying device.

DE 10 2006 010 974 describes a conveying device including a conveying belt as well as an essentially horizontal guide frame with two lateral sidewalls, which extend horizontally in the longitudinal direction of the conveying belt and at whose ends a deflection roller for the conveying belt and drivable by a drive is rotatably mounted. The drive is arranged between the two sidewalls.

The solutions known from the state of the art, however, have disadvantages. Thus drive units that are arranged within the conveying device are low in power due to their necessary compact design. The construction length of such conveying devices is limited by way of this. A modular construction of the conveying device, which is to permit large construction lengths can therefore hardly be implemented by way of conventional construction manners.

SUMMARY OF THE INVENTION

It is therefore the object of the invention, to suggest a conveying device of the initially mentioned type, which is designed in a compact manner and in particular has a low construction height.

Further objects of the invention are e.g. to suggest a conveying device which:

has no drive elements outside the head-ends and the side closure beams, is constructed in a modular manner, can be designed in different construction lengths and/or can produce a sufficient drive power even with a greater construction length.

The conveying device according to the invention has at least one drive device that is arranged:

between both head-ends and spaced from these, between the two side closure beams and between the upper conveying section and the lower return section.

The drive device moreover includes a drive element that is arranged in a circulating manner about two deflection elements spaced from one another in the conveying direction and is driven by at least one drive motor. The deflection elements can be deflection pivots.

The circulating drive element in particular forms a conveying-side section, which is directed to the conveying section of the conveying element. The conveying-side section in particular is designed as a drive section.

The circulating drive element in particular moreover forms a return-side section, which is directed to the return section of the conveying element. The return-side section of the drive element in particular is arranged lying opposite to the conveying-side section of the drive element. The return-side section can likewise be designed as a drive section.

The drive of the conveying element is effected via one or more drive sections of the drive element. The drive element with the conveying element in the drive section forms a contact fit for transmitting a drive force.

The drive force can be transmitted from the drive element onto the conveying section of the conveying element. For this, in particular engagement elements of the drive element, and contact elements of the conveying element, form a contact fit, in particular an engagement, of the type described hereinafter, in the conveying section of the conveying element.

The drive force can be transmitted from the drive element onto the return section of the conveying element. For this, in particular engagement elements of the drive element, and contact elements of the conveying element, form a contact fit, in particular an engagement, of the type described hereinafter, in the return section of the conveying element.

The drive force can also be transmitted from the drive element onto the conveying section as well as onto the return section of the conveying element. For this, in particular engagement elements of the drive element and contact elements of the conveying element form a contact fit, in particular an engagement, of the type described hereinafter, in the return section as well as in the conveying section of the conveying element.

The drive element can form a positive connection with the conveying element, for transmitting a drive force from the drive element onto the conveying element. The connection can also be non-positive. The connection can moreover be a combination of a positive and non-positive connection.

The drive element can form an extensive (large-surfaced or expansive) contact fit with the conveying element, for the extensive transmission of the drive force. The extensive contact fit can also additionally serve for the extensive support of the conveying element.

The drive element can form a contact fit, in particular an engagement, with the conveying element, for transmitting a drive force.

The drive device is spaced from the head-ends. The deflection of the drive element is preferably likewise spaced from the head-ends in each case.

According to a further development of the invention, the conveying section is arranged above the drive element. The drive element supports the conveying section and at the same time forms a contact fit, in particular an engagement, with this, for transmitting a drive force onto the conveying element.

The drive element in particular includes an endlessly designed drive body. The drive body can be designed in an extensively extended manner. The drive body can be designed of several parts. The drive body in particular can be a link chain with a plurality of links that are articulately connected to one another.

The drive body can also be designed in a single-part manner. The drive body can e.g. be designed as a belt, for instance a steel belt, strap or cable.

An engagement element or engagement elements can be arranged on the drive body, in particular on individual links or alls links of a link chain, for forming a contact fit, in particular an engagement, with the conveying element. The engagement elements in the drive section for example are directed towards the conveying element.

The engagement elements on the drive body can engage in contact elements on the conveying element. The engagement elements and contact elements therefore have the same division, in particular in the drive section.

The engagement elements in particular can be designed such that these engage over the contact elements. The engagement elements engage over the contact elements in particular towards the conveying element. The engaging-over in particular is such that the engagement elements secure the conveying element from an evasive movement away from the drive element, said movement in particular being directed perpendicularly to the conveying plane.

If the drive element drives the conveying section of the conveying element, then the engagement elements in particular prevent an evasive movement to the top.

If the drive element drives the return section of the conveying element, then the engagement elements in particular prevent an evasive movement to the bottom.

An optimal contact fit between the engagement element and the contact element for the purpose of driving the conveying element is ensured by way of this.

The engagement elements in the drive section via the contact elements actively engage into the conveying element for the purpose of transmitting a drive force.

The engagement elements in particular form a recess, into which a contact element at least partly engages in each case. The engagement elements can be designed in a hook-like manner.

The contact elements can be hook-like elements, which are directed towards the drive element.

The contact elements can also be formed by the connection pivots of a link chain.

The contact elements can also be formed by pin-like bodies, in particular pins, on the chain links of the link chain. The pin-like bodies can be of metal, such as steel. The pin-like bodies can be fastened on the chain links via insert connections. The pin-like bodies are characterised by a greater loading capacity than, for example, contact elements of plastic that are formed onto the chain links.

The engagement elements can be pivotably mounted on the drive body about a pivot axis. The pivot axis can be a physical pivot or also only a geometric pivot axis.

The engagement elements on moving into drive section, in particular can be pivoted into engagement with the contact elements by way of this.

The engagement elements on moving out of the drive section can moreover pivot out of the engagement with the contact elements, actively or passively, e.g. by way of gravity.

The drive device in the drive section can include a guide device, in particular a guide rail, which guides the engagement elements in the drive section, in particular in a sliding manner.

The guidance serves for fixing the pivot position of the engagement element. The engagement elements on moving into the drive section can thus be pivoted into engagement with the contact elements by way of the design of the guide device.

The engagement elements moreover in the drive section in particular can be held in their engagement position due to the design of the guide device, by way of the support section being supported in the guide device.

The engagement elements on pivoting out of the drive section in particular can be pivoted actively or passively, e.g. by way of gravity, out of the engagement with the contact elements, on account of the design of the guide device.

The pivot position is thus fixed via the guiding of the support section arranged subsequently to the pivot axis, by the guide rail.

The extensively extended conveying element can form a plane rest surface, i.e. a conveying plane, for the conveyed goods. The conveying element can be a conveying belt.

The conveying element is preferably designed of several parts. The conveying element in particular can be a link chain with a plurality of links which are articulately connected to one another. The conveying element can comprise a plurality of link chains which are arranged in parallel next to one another.

The conveying element, in particular individual or all links of a link chain can comprise contact elements for forming the engagement with the drive element. The contact elements are e.g. arranged on that side of the conveying element, which is opposite to the conveying surface. The contact elements, for example, are directed towards the drive element.

The link chain of the drive and/or conveying element can be a module belt chain, also called mat chain. The links are designed as module belt links.

The module belt links have a central body. Considered in the longitudinal extension of the module belt chain, several projections, e.g. prongs or lugs are arranged next to one another on the central body at both sides in each case, for a meshing engagement with projections, e.g. prongs or lugs, of an adjacent module belt link. The module belt links are articulately connected to one another via a rotation pivot in each case. The rotation pivot leads through the projections which meshingly engaged with one another.

The engagement between the drive element and the conveying element can be formed by way of a mutual meshing of recesses and prominences. Accordingly, the engagement elements can be prominences or recesses.

Contact elements on the conveying element and engagement elements on the drive element in particular can be designed and arranged complementarily to one another, in order to thus form the engagement.

The conveying element can thus include prominences and the drive element recesses, or vice versa. It is also possible for the conveying element and the drive element to each include recesses as well as prominences. These, for example, can be arranged in an alternating manner.

The engagement elements or contact elements which are designed as prominences can comprise a main body e.g. of a rubber-elastic material. The main body can be fastened on the conveying element or drive element, or on its links, via a connector. The connector can include a pin, which is led through the main body. The connector can moreover include an outer-lying holding plate. The pin is led through the main body and the holding plate. The main body is held via the holding plate in this manner.

The pin can be part of a rivet connection. The rubber-elastic main body can be fastened on the conveying element or drive element amid biasing.

It is also possible for the engagement elements or contact elements to be magnetic. The contact fit or engagement can thus be formed or at least assisted via mutual, magnetic attraction of the engagement elements and contact elements. At least one of the engagement elements or contact elements includes a magnet. One of the engagement elements or contact elements can also include a magnetisable material.

The drive motor can drive a deflection pivot of the drive element. One can also envisage two drive motors in each case driving a deflection pivot of the drive element. The drive motor can for example be arranged with its motor shaft coaxially to the deflection pivot (axis).

The drive device according to the invention can be arranged so as to be operated in two conveying directions, specifically in a forwards and rearward direction.

The at least one drive device can, for example, be designed as an intermediate drive. The conveying device can accordingly include a further drive device. This, for example, can be designed as a main drive.

The conveying section of the conveying element corresponds to that section, on which the article to be conveyed lies on the conveying element and is conveyed in the conveying direction. The conveying element is led back in the return section counter to the conveying direction, e.g. below the conveying section.

The conveying element is deflected at the head-ends from the conveying section into return section and vice versa. The head-ends can include rotatably mounted deflection pivots for deflecting the conveying element.

The conveying device can then include a further drive device with a drive motor, which drives the deflection pivot at one of the two head-ends. The deflection pivot and the conveying element are thereby arranged in a manner cooperating with one another such that the deflection pivot can transmit a drive force onto the conveying element. This can be effected, for example, via a friction fit or via a positive, e.g. toothed engagement between the deflection pivot and the conveying element.

Both deflection axes can be driven at both head-ends by a drive device, which is described above. The further drive device can be designed as a main drive.

The side closure beams laterally enclose the conveying device. The side closure beams can consist of a plurality of longitudinal profiles, which are connected to one another in the longitudinal direction. The multi-part design of the side closure beams permits a modular construction of the conveying device.

The side closure beams can be part of a support frame of the conveying device. The side closure beams can be arranged parallel to one another. The side closure beams together with transverse beams at the head-ends, and/or transverse beams between the head-ends can form a support or carrier frame.

The drive device and in particular the drive motor is hereby preferably likewise arranged between the side closure beams, between the head-ends as well as between the conveying section and return section of the conveying element.

The deflection pivots of the drive element can be rotatably mounted via a mounting in holders. The deflection pivots can be rotatably mounted in the holder, e.g. via ball bearings.

The holders thereby support the deflection pivots. The holders in turn can be fastened on transverse beams, which e.g. run between the side closure beams and transversely to these. The transverse beams for their part can be connected to the side closure beams or to longitudinal profiles of the side closure beams.

The deflection pivots can e.g. extend between the side closure beams merely over a part-stretch. I.e. the deflection pivots do not extend up to the side closure beams. The end sections of the deflection pivots can be rotatably mounted in terminating holders.

The holders towards the conveying section of the conveying element can include a sliding surface, on which the conveying section is guided in a sliding manner and is supported to the bottom.

Slide rails for a sliding support of the conveying section can moreover be additionally arranged in the region of the drive device.

The transverse beams can be or include transverse profiles. The transverse beams can be of one part or of several parts and, for example, include several longitudinal profiles that are connected to one another in the longitudinal direction and/or in the transverse direction of the transverse beams. The transverse beams can run parallel to one another.

At least one drive device of the type described further above, together with the transverse beams and longitudinal profiles of the side closure beams can form an assembly unit, wherein the longitudinal profiles, which are spaced from one another, are connected to the transverse beams, which are spaced from one another, into a frame. The frame can e.g. be rectangular. The at least one drive device is arranged within this frame. Thus, one or more drive devices can be present in an assembly unit.

The at least one drive device for example is fastened on the transverse beams via holders. The at least one drive device can thus be supported on the transverse beams via deflection pivots, which, e.g., are rotatably mounted in the holders.

The assembly unit is preassembled and in the end assembly can be installed into the conveying device as a complete construction unit. This, for example, is effected by way of the longitudinal profiles of the assembly unit being connected to adjacent longitudinal profiles of the side closure beams. The assembly unit can preferably be accordingly disassembled from the conveying device. This is effected by releasing the connection between the longitudinal profiles, and the assembly unit being lifted out of the conveying device.

The assembly and disassembly of the assembly unit is preferably effected when the conveying belt is not assembled. The assembly unit can then be installed between the head-ends at almost any location. Also several assembly units, e.g. spaced from one another, and with drive devices can be installed between the head-ends, depending on the length of the conveying device.

The drive device can include one or more drive motors. The drive motor, for example, is an electrical drive motor. The drive motor in particular can be a synchronous motor, an asynchronous motor or a D.C. motor. The drive motor can thus be a brushless D.C. motor (BLDC-motor).

The drive motor preferably comprises a microcontroller for carrying out motor control functions. The drive motor in particular can comprise an electronic speed controller or ESC for the control of the speed and/or as a dynamic brake.

The drive device between the head-ends, with regard to control technology for example can be designed as an auxiliary drive which, with regard to drive technology, assists the main drive or main drives, which e.g. are arranged at the head-ends and drive the deflection pivots there.

The largest diameter of the drive motor including motor casing can, for example, be 50 to 100 mm, in particular 55 to 70 mm.

The conveying device can include several drive devices that are arranged one after the other. The conveying device can include several, e.g. two drive devices, which are arranged next to one another. The conveying device can include several drive devices that are arranged one after the other and next to one another. The drive devices can form the support arrangement or a part of the support arrangement.

The support arrangement is arranged between the two side closure beams as well as between the two head-ends. The support arrangement can include support rollers, via which the conveying section of the conveying element is supported in a rolling manner.

The support rollers can be driven passively by the conveying element, e.g. can be brought in a rolling movement. The drive of the roller bodies or the support rollers in particular is effected by way of the conveyed article with its weight force bearing on the support rollers via the conveying element, i.e. the conveying element pressing against the support rollers.

The support arrangement can include a plurality of rotatable rollers, on which the conveying element is supported with its conveying section in a rolling manner. The rollers are preferably arranged in a manner distributed over the surface expanse of the conveying element.

The rollers can be axially mounted via a physical rotation pivot, wherein the rotation pivot is arranged in a stationary manner. The weight load is transmitted via the rotation pivots from the rollers onto the support arrangement.

The rollers can be attached on that side of the conveying element, which lies opposite the conveying surface, and be rotatably mounted on this side. Here, the rollers co-move with the conveying element.

The support arrangement can also comprise a plurality of support units, which each include a plurality of rollers. The rollers are arranged around a support body and roll along a closed circulating path on this. The weight load is transmitted from the conveying element onto the support body via the lateral surface of the rollers. The rollers are driven by the conveying element, which is moved past these. A conveying device with the described support units is disclosed for example in WO 2010/148523 A1.

The assembly unit with the drive device can likewise include a support arrangement of the type described above. The assembly unit in particular can include support units for the rolling support of the conveying section. The support arrangement or the support units are arranged in each case between the side closure beam and the drive element or the deflection pivots.

The conveying device can be used for conveying bulk goods or piece (individual) goods, such as non-moving goods or goods or articles which moves themselves. The individual goods can be products or living beings, e.g. persons, animals or plants. The conveying surface, which is formed by the extensively extended conveying element, can be run in a level or inclined manner. The conveying element can run linearly in the conveying section.

The conveying device can e.g. be designed as a moving walkway or rolling walkway. Moving walkways or rolling walkways are applied e.g. in airports, shopping centers or railway stations for moving persons over a longer distance.

The friction is significantly reduced thanks to the rolling support and guidance of the conveying element in the region of the conveying section, by which means lower-powered and smaller drive motors can be applied for the drive of the conveying element.

The conveying device can be constructed in a very compact manner by way of the integrated construction manner, with which the drive device as well as the support arrangement are arranged within the circulating conveying element and within the side closure beams. The conveying device in particular has no disturbing contours, which are produced by the device component and which lie outside the side closure beams and the conveying element.

The construction height as well as the intrinsic weight can therefore be kept low, which in turn permits the use of the conveying device with restricted spatial conditions. The construction height from the ground to the conveying surface can thus e.g. be only 120 mm.

The conveying device according to the invention in particular is also applied as a worker-rider belt for the reasons mentioned above. Worker-rider belts are applied in industrial manufacture, in which working steps, such as assembly work, has to be carried out on moving-past products of a production line. The worker is co-moved on a worker-rider belt, parallel to the object in the conveying direction, in order to give the worker a sufficient amount of time for him to carry out his working steps on moving-past objects. The worker can, e.g., be co-moved with the object in a speed-synchronous manner.

Such a worker-rider belt can have a length of a few meters e.g. of 20-50 m. An individual worker-rider belt can form a subassembly, wherein far greater conveying stretches can be achieved by joining together and, as the case may be, a common control of such subassemblies.

The conveying device according to the invention can also applied as a loading space conveying device. The loading space conveying device can be applied e.g. in a road vehicle such as a lorry, in a rail vehicle such as freight wagon, in a marine vessel such as a freight ship, or in an aircraft such as an aeroplane.

The loading space conveying device can moreover be applied in a freight container or ship container for loading and unloading the container. Such containers serve for the transport of goods by road, rail, air or sea and are accordingly transported by road vehicles, rail vehicles, aircraft or water vehicles.

The conveying device according to the invention can moreover also be applied as a storage space conveying device in store systems. The store system is defined, for example, by a plurality of pallet spaces.

BRIEF DESCRIPTION OF THE DRAWINGS

The subject-matter of the invention is hereinafter explained in more detail by way of preferred embodiment examples which are represented in the attached drawings. Shown schematically in each case are.

DETAILED DESCRIPTION OF THE INVENTION

Basically, the same parts are provided with the same reference numerals in the figures.

Figure 1:
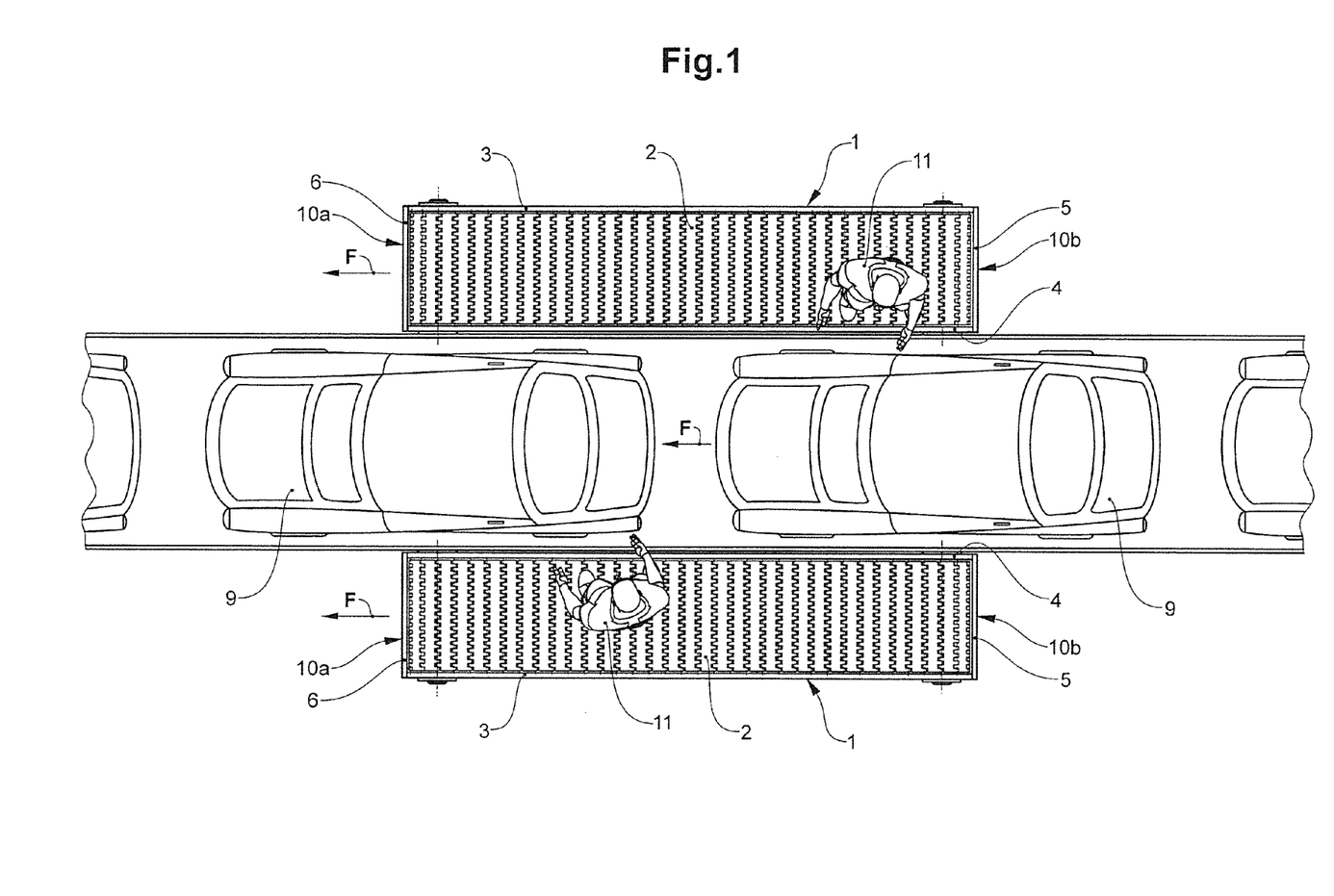
FIG. 1 is a plan view of two conveying devices, in the embodiment as worker-rider belts.

FIG. 1 shows an assembly line for the assembly of motor vehicles 9. The automobiles 9 are conveyed along assembly line in the conveying direction F, whilst working steps are simultaneously carried out on the automobile 9 by the workers 11. Conveying devices 1 according to the invention and in the embodiment of worker-rider belts are arranged on both sides of the assembly line. The worker-rider belts 1 include a circulating conveying element 2 in the form of a module belt chain. The module belt chain forms a level conveying surface, on which the workers 11 are co-moved with the automobiles 9 in the conveying direction F.

The module belt chain 2 is framed laterally by side closure beams 3, 4 and at the head-ends 10a, 10b by head-end transverse beams 5, 6.

The time available for the working steps on the automobiles 9 can be increased by way of co-moving workers 11 with the automobiles 9 in the conveying direction F.

The worker-rider belt 1 according to the invention is constructed in an extremely compact manner, and in particular has a comparatively low height. The worker-rider belt moreover has no drive components outside the carrier frame which, amongst other things, is formed by the head-end transverse beams 5, 6 and the side closure beams 3, 4.

Figure 2:
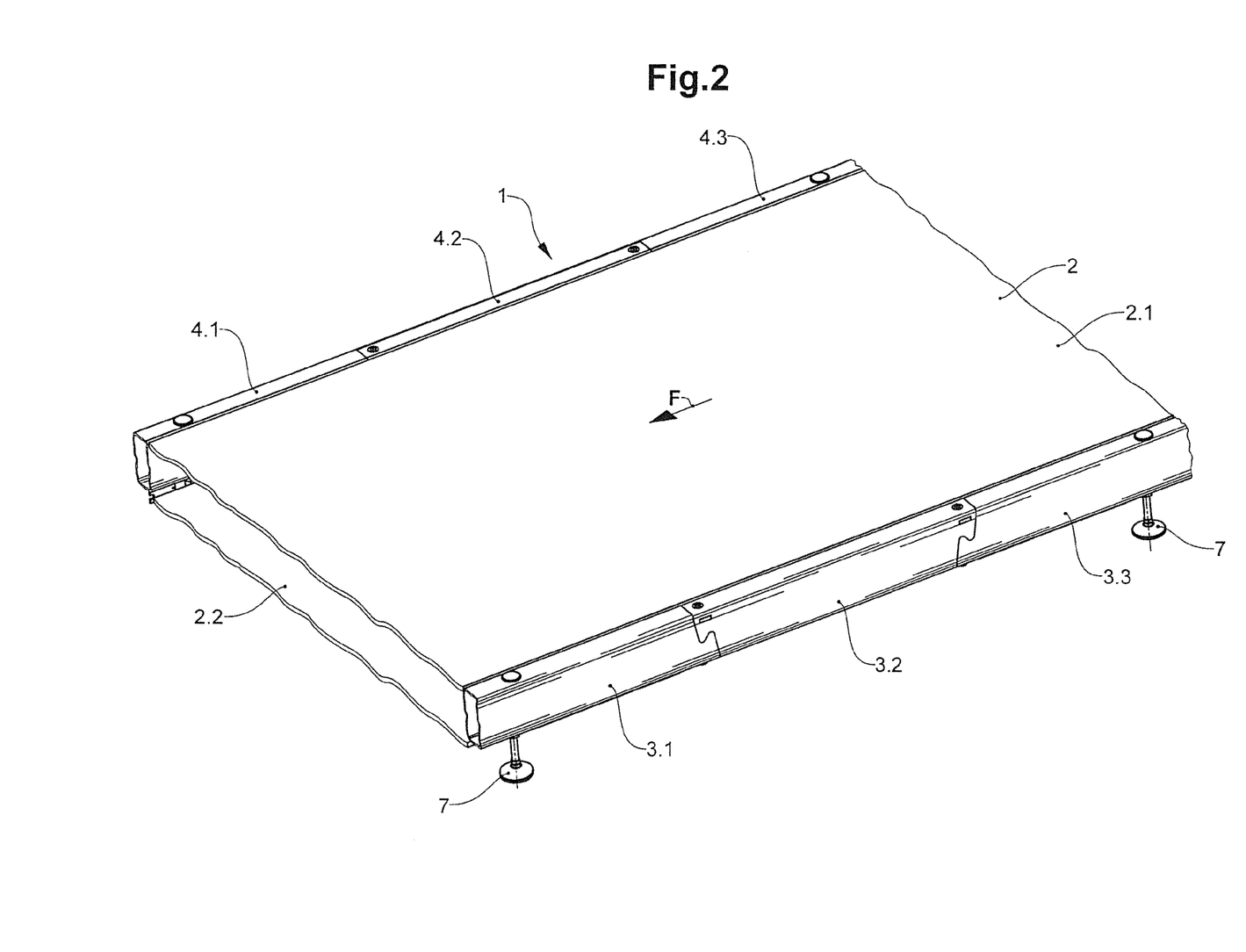
FIG. 2 is a perspective view of a detail of a conveying device.

As can be deduced from FIG. 2 in a more detailed manner, the schematically represented module belt chain 2 forms an upper conveying section 2.1 and a return section 2.2, which is arranged below the conveying section 2.1.

The side closure beams 3, 4 are each designed of several parts and consist of a plurality of longitudinal profiles 3.1, 3.2, 3.3; 4.1, 4.2, 4.3, which are connected to one another in the longitudinal direction, which is to say the conveying direction F.

The conveying device 1 is supported towards the ground via height-adjustable support feet 7. The support feet are attached on the side closure beams 3, 4.

Figure 3:
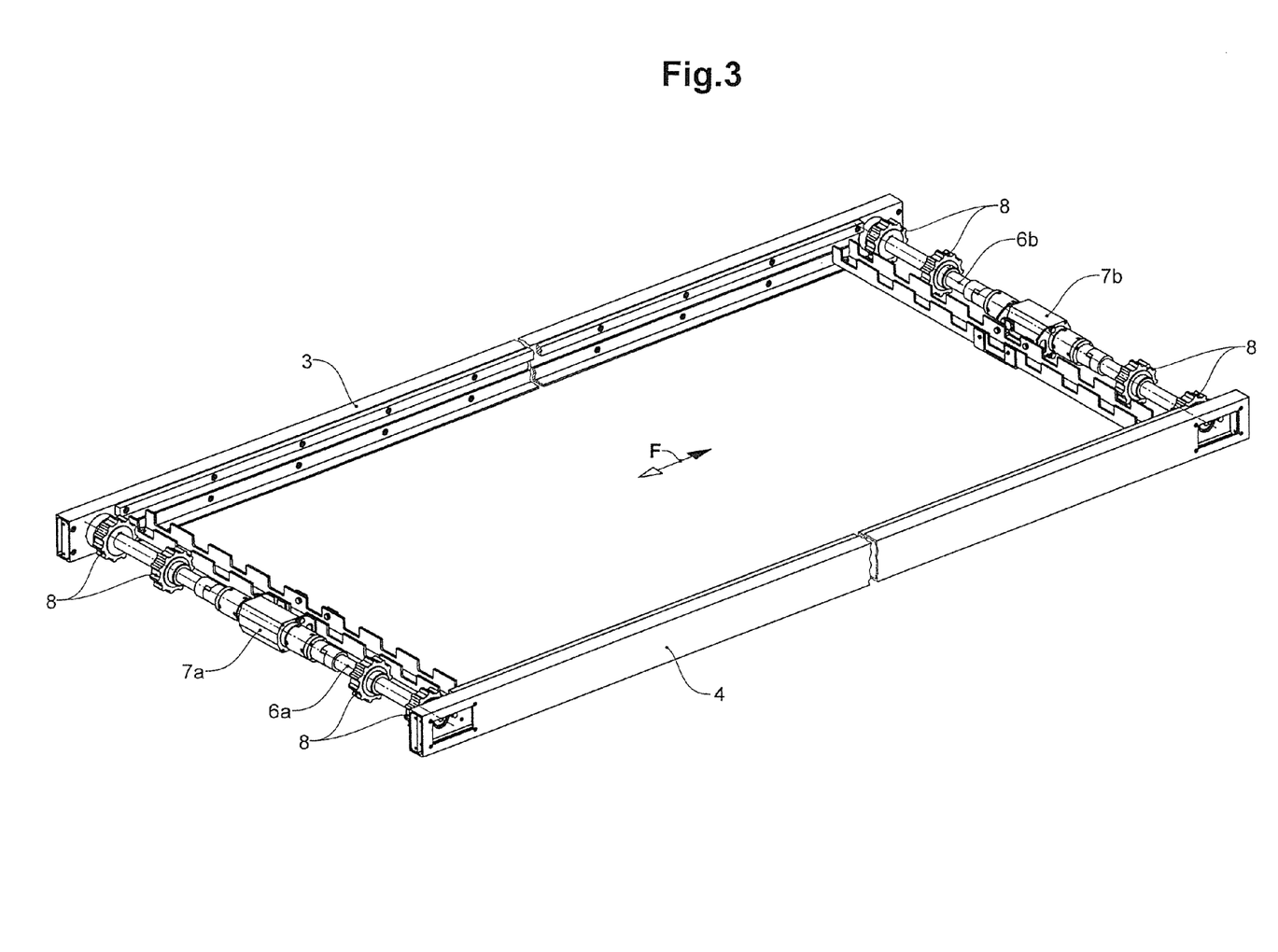
FIG. 3 is a perspective view of a part-assembled conveying device from the region of the head-ends.

FIG. 3 shows a conveying device 1 according to the invention, in a partly assembled condition without a conveying element. The conveying device has two side closure beams 3, 4, which are arranged parallel to one another in conveying direction F and which are distanced to one another. In each case, a deflection pivot 6a, 6b for deflecting the conveying element from the conveying section into return section or vice versa is arranged at the head-ends 10a, 10b.

The deflection pivots 6a, 6b are each actively driven by an electric drive motor 7a, 7b. The motor shaft of the drive motor 7a, 7b is arranged coaxially to the deflection pivot 6a, 6b in each case.

Drive elements 8 in the form of cogs are arranged on the deflection pivots 6a, 6b in each case. The cogs 8 form a positive engagement with recesses on the conveying element (not shown), in order to thus a transmit drive force from the deflection pivot 6a, 6b onto conveying element.

Figure 4:
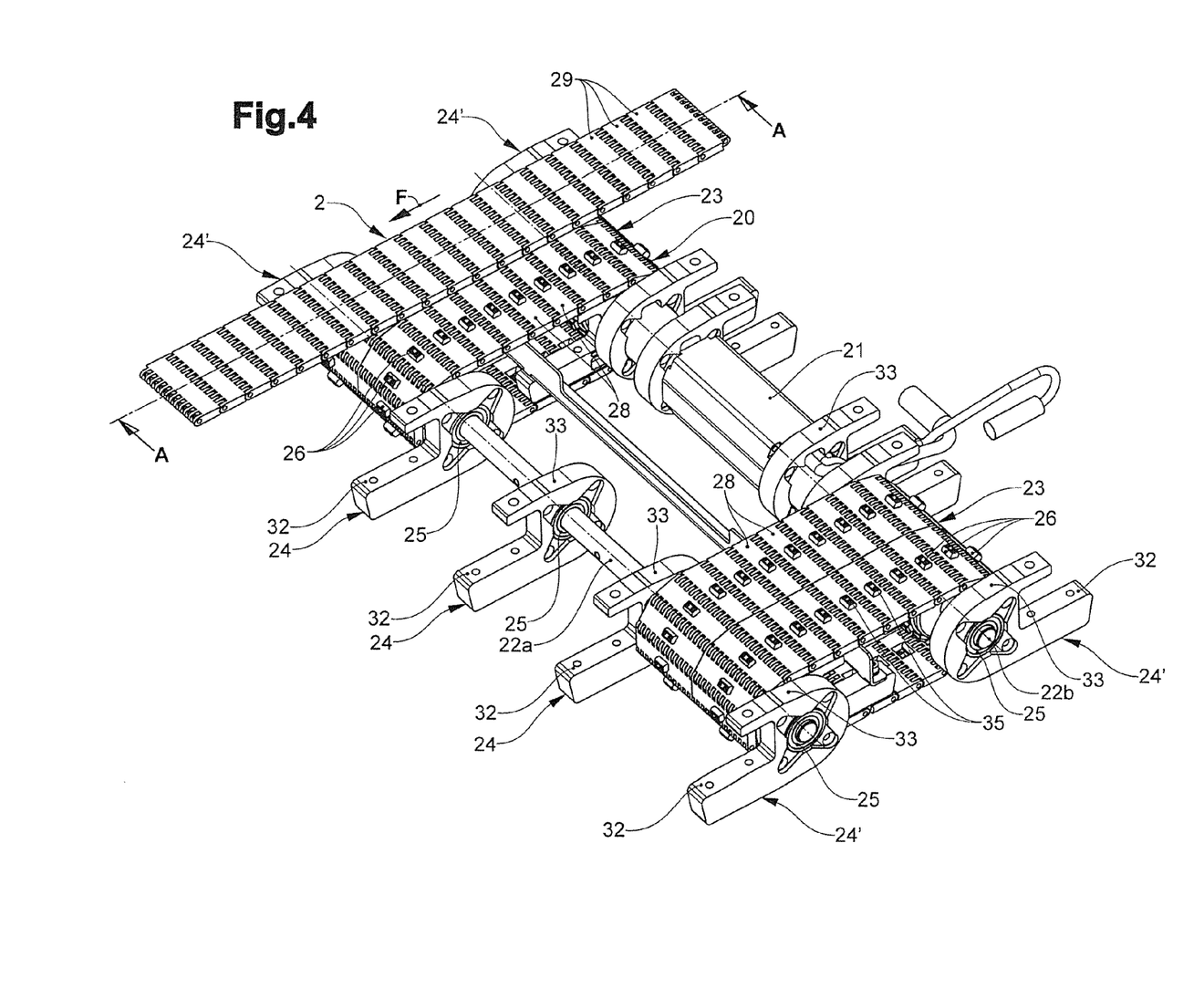
FIG. 4 is a perspective view of the drive device.

FIG. 4 shows a drive device 20 according to the invention that is designed as an intermediate drive 20. The drive device 20 includes two deflection pivots 22a, 22b, which run transversely to the conveying direction F and are spaced from one another in the conveying direction F.

Two drive elements 23 are arranged in a manner circulating around the two deflection pivots 22a, 22b, next to one another considered in the conveying direction F. The drive elements 23 are designed as module belt chains from a plurality of module belt links 28.

Lugs 26 with a main body 37 of a rubber-elastic material are fastened on the drive side of the module belt links 28 of the drive element 23. The lugs 26 are attached on the module belt links 28 via pin connections 25.

Figure 7:
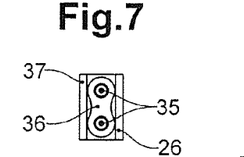
FIG. 7 is a plan view of a lug according to FIGS. 6a to 6c.

The pins 35 are guided by a plate 36 arranged at the outside on the main body 27, as well as by the main body 37 itself. The pins 35 connect the plate 36 to the main body 37 and to the module belt link 28 (see FIGS. 5 and 7).

FIGS. 6a to 6d show different embodiments of lugs 81, 82, 83, 84. The lugs 81, 82, 83, 84 are arranged in each case on a drive element 72 and are engaged with recesses 85 on the conveying element 71.

Figure 6A:
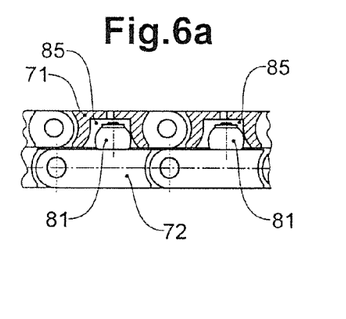
FIGS. 6a-6d are lateral views of different embodiments of lugs.
Figure 6B:
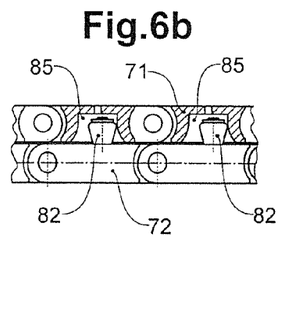
Figure 6C:
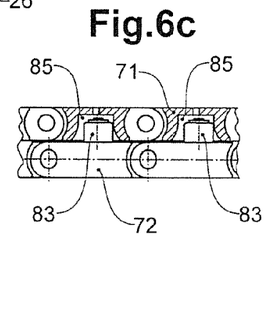
Figure 6D:
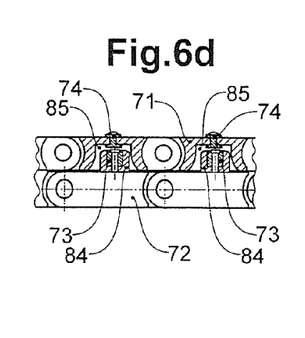

The lug 81 according to FIG. 6a has a peripheral surface, which is arched in a barrel-like manner. The lug 82 according to FIG. 6b is designed in a conical manner, wherein the main body widens outwards departing from the drive element. The lug 83 according to FIG. 6c is designed in a cylinder-shaped manner. The lug according to FIG. 6d includes a magnet 73. A magnetisable element, e.g. of an iron metal is attached in the recess 85 of the conveying element 71. The magnet 73 and the magnetisable element 74 attract one another and thus assist the engagement.

The drive elements 23 form a conveying-side drive section 23.1 and a return-side section 23.2, which is arranged below the drive section 23.1. The conveying section 2.1 of the conveying element 2 lies on the drive section 23.1.

The conveying element 2 is likewise designed as a module belt chain 2 of a plurality of module belt links 29. The module belt chain 2 forms a plane conveying surface in the conveying section 2.1. The module belt links 29 defines recesses 27 on the side that is opposite to the conveying surface.

The lugs 26 of the drive element 23 then engage into the recesses 27 of the conveying element 2 and form a positive fit for transmitting a drive force from the drive element 23 onto the conveying element 2. The rubber-elastic characteristics of the lugs 26 additionally ensure a friction or non-positive connection to the conveying element 2.

The one deflection pivot 22b of the drive device 20 is driven by way of an electrical drive motor 21. Drive elements 30 in the form of drive cogs are provided on the deflection pivot (see FIG. 5), for the transmission of the drive force from the deflection pivot 22b onto the drive elements 23.

Figure 5:
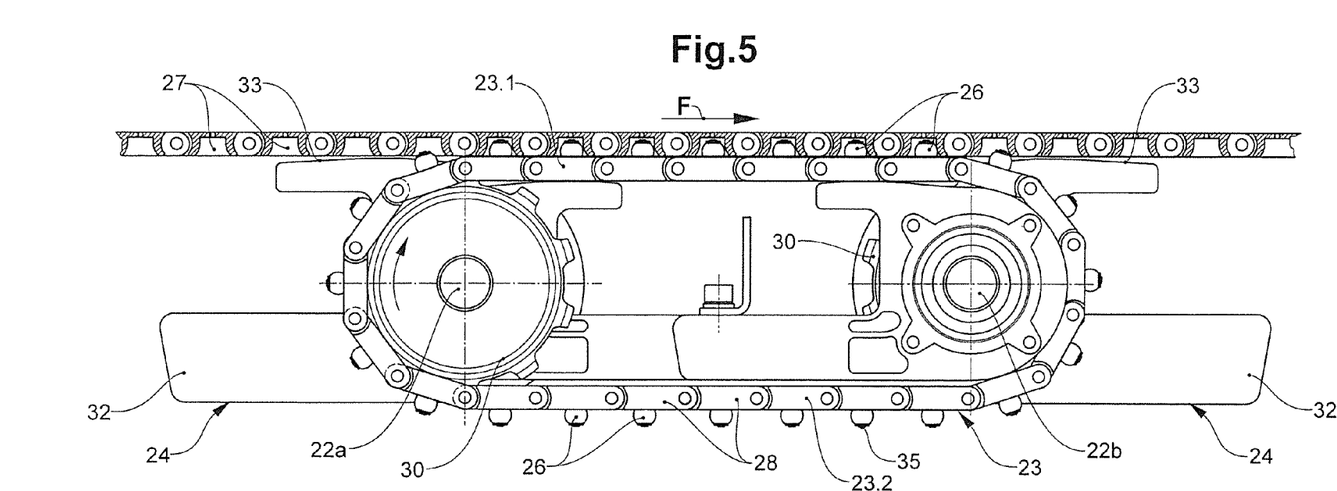
FIG. 5 is a cross-sectional view of the drive device according to FIG. 4, along line A-A.

The teeth of the drive cogs 30, in the deflection engage in recesses on the module belt links 28 of the drive element 23. These recesses are arranged on the side of the module belt links 28 that lies opposite the side comprising the lugs.

The drive motor 21 is arranged between the two drive elements 23 and coaxially to the deflection pivot 22b. Basically, both deflections pivots 22a, 22b can each be driven by an electrical drive motor.

The deflection pivots 22a, 22b are mounted in a freely rotatably manner via holders 24 and are accordingly supported. The deflection pivots 22a, 22b for this are led through the holders 24 and are mounted in a rotatable manner with respect to these, via suitable mountings 25 such as ball bearings. Thus several holders 24, which support the deflection pivots 22a, 22b over their entire longitudinal extension, are attached along the deflection pivots 22a, 22b in a manner spaced from one another.

In each case, a terminating holder 24', which receives the end section of a deflection pivot 22a, 22b, is arranged at the outer side of the drive element 23. The deflection pivots 22a, 22b as a result of this do not extend over the entire transverse extension between the longitudinal profiles 3.2, 4.2 of the side closure beams.

The holders 24 in each case form a fastening limb 32, via which the holders 24 and, with this, indirectly also the deflection pivots 22a, 22b are fastened on transverse beams 53, 54, e.g. screwed. The transverse beams 53, 54 in turn are fastened, e.g. screwed, at the end side on longitudinal profiles 3.2, 4.2 of the two side closure beams (see FIG. 8).

The holders 24 moreover in each case form a sliding surface 33 for the conveying section 2.1 of the conveying element 2, which moves over these. The sliding surfaces 33 serve as an alternative support, instead of support units with support rollers, which do not have sufficient space in the region of the drive device 20.

Moreover, slide rails 55 for the sliding support of the conveying section are arranged between the two conveying elements 23 and above the deflection pivots 22a, 22b.

A drive arrangement 60 with support units 61 for the rolling support of the conveying section 2.1 is arranged between the longitudinal profiles 3.2, 4.2 of the side closure beams and the drive elements 23 or the holders 24', which are at the outer side.

The support units 61 in each case include a central support body, around which a plurality of support rollers 62 arranged one after the other roll. The support rollers 62 are not mounted by pivot. The force transmission from the conveying element 2 onto the central body of the support unit 61 is effected in each case via the lateral surface of the support rollers 62.

Figure 8:
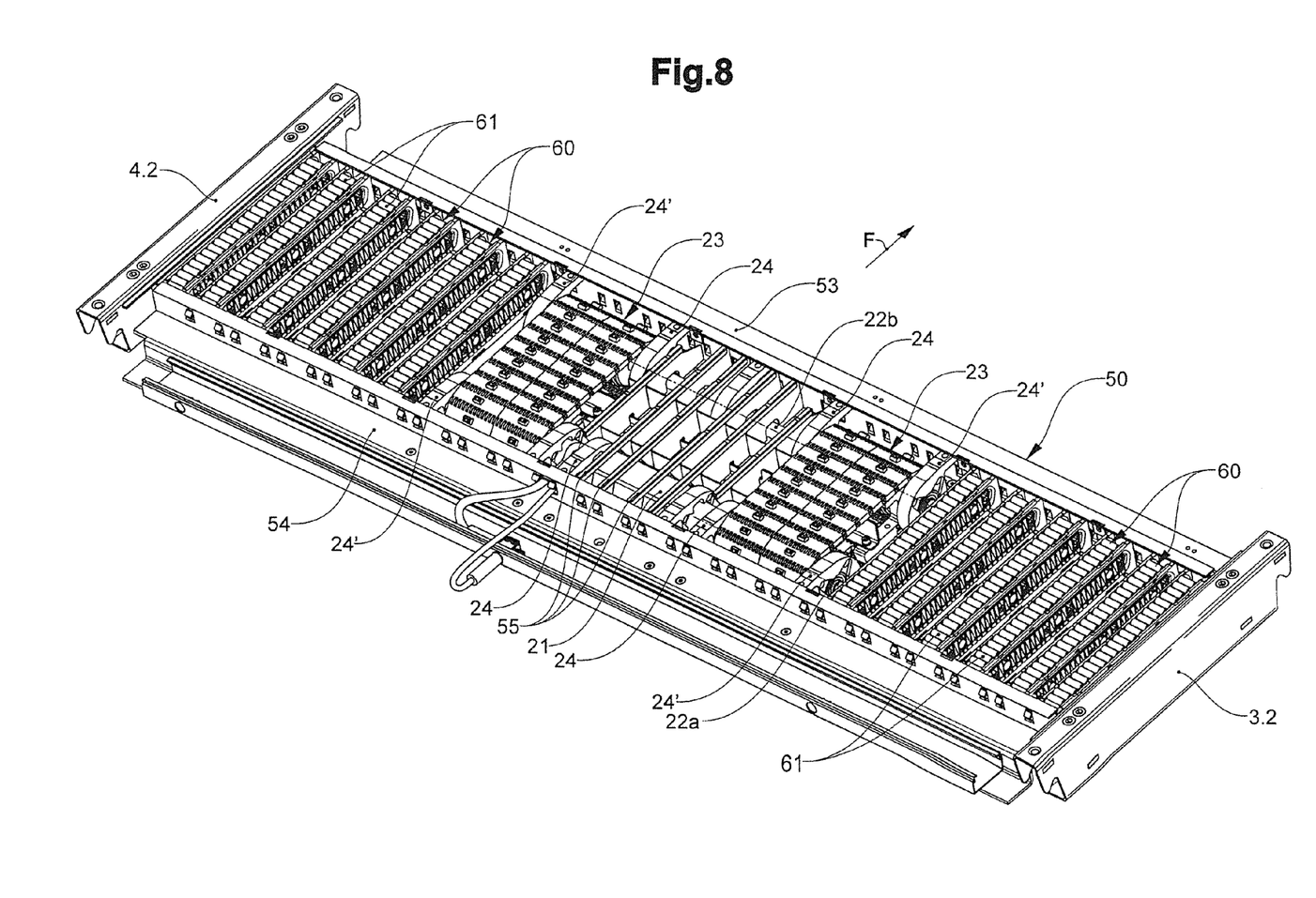
FIG. 8 is a perspective representation of a module unit with a drive device.

FIG. 8 shows an assembly unit 50 according to the invention. The assembly unit 50 includes a frame that is formed from the two transverse beams 53, 54 as well as from longitudinal profiles 3.2, 4.2 of the two side closure beams. The frame is rectangular here.

The drive device 20, including the drive motor 21, the two deflection pivots 22a, 22b and the peripherally arranged drive elements 23, is arranged within this frame and is connected via the holders 24, 24' to the transverse beams 53, 54 in the manner described above.

The assembly unit 50 with the final assembly can be installed into the conveying device 1 as a complete construction unit. This is effected by way of the assembly unit 50 with its longitudinal profiles 3.2, 4.2 being releasably connected to adjacent longitudinal profiles 3.1, 3.3; 4.1, 4.3 of the side closure beams 3, 4. The assembly unit can accordingly also be dissembled again from the conveying device 1.

Figure 9:
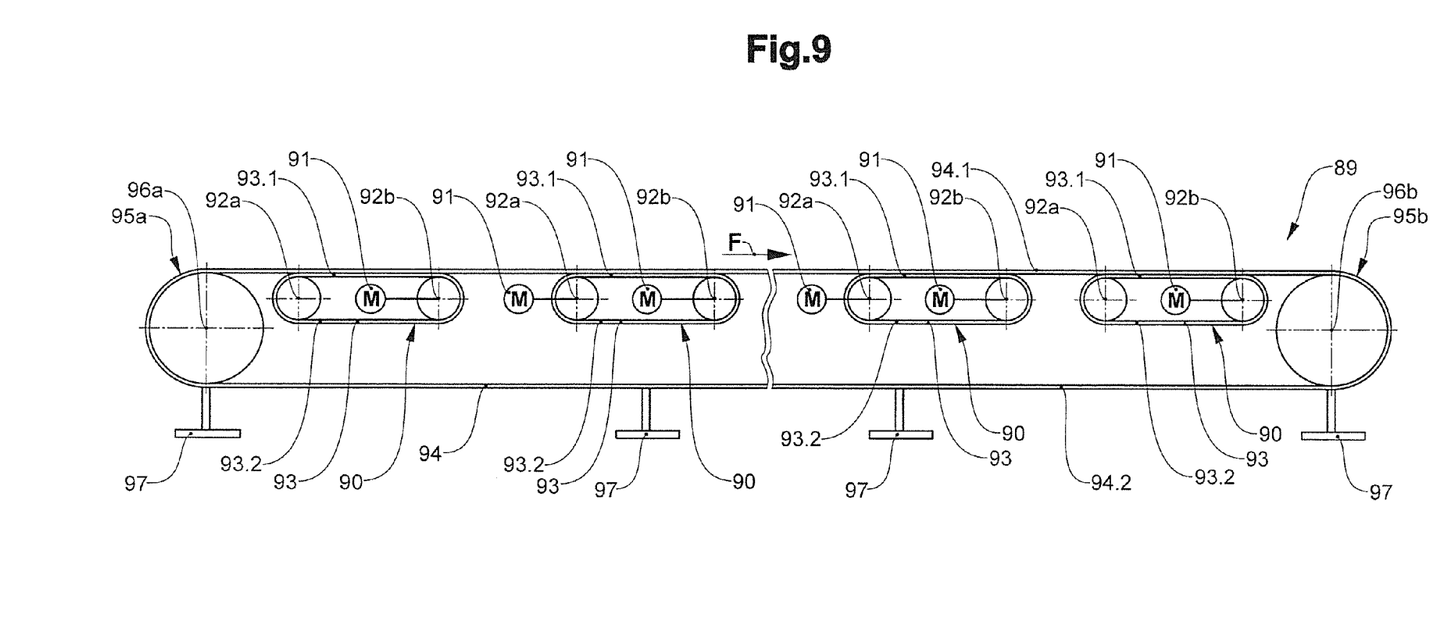
FIG. 9 is the lateral view of a particular embodiment of a conveying device.

The conveying device 89 according to FIG. 9 includes an extensive, flexible conveying element 94 with a conveying section 94.1 and with a return section 94.1 led below the conveying section 94.1. The conveying device 89 is supported to the ground via support feet 97.

The conveying element 94 is led in a circulating manner and at a first head-end 95a of the conveying device 89 is deflected about a first deflection pivot 96a and at a second head-end 95b, 96b is deflected about a second deflection pivot 96b. One of the two deflection pivots 96a, 96b or both deflection pivots 96a, 96b can be driven.

Four drive devices 50, which are spaced from one another when considered in the conveying direction F, are arranged one after the other between the two head-ends 95a, 95b and in a manner spaced from the head-ends.

The drive devices 90 in each case include a circulating drive element 93. The drive element 93 is deflected about two deflection pivots 92a, 92b, which are spaced from one another in the conveying direction F. The drive element 93 forms a conveying-side drive section 93.1 and a return-side section 93.2, which is arranged below the drive section 93.1.

The conveying element 94 is driven by the drive devices 90. This is effected by way of conveying section 94.1 of the conveying element 94 forming a contact fit in each case with the drive section 93.1 of the drive element 93 driven by the drive motor 91.

One of the deflection pivots 92b of the drive device 90 is driven via a drive motor 91. The driven deflection pivot 92b transmits the drive moment onto the drive element 93. Both deflection pivots 92a, 92b are driven at the middle two drive devices 90.

The drive devices 90 then additionally form the support arrangement. This means that the conveying section 94.1 of the conveying element 94 is not only driven by the drive devices 90 but is also additionally supported in an extensive, which is to say large-surfaced manner.

The drive devices 90 can each be part of an assembly unit of the type described above.

Figure 10:
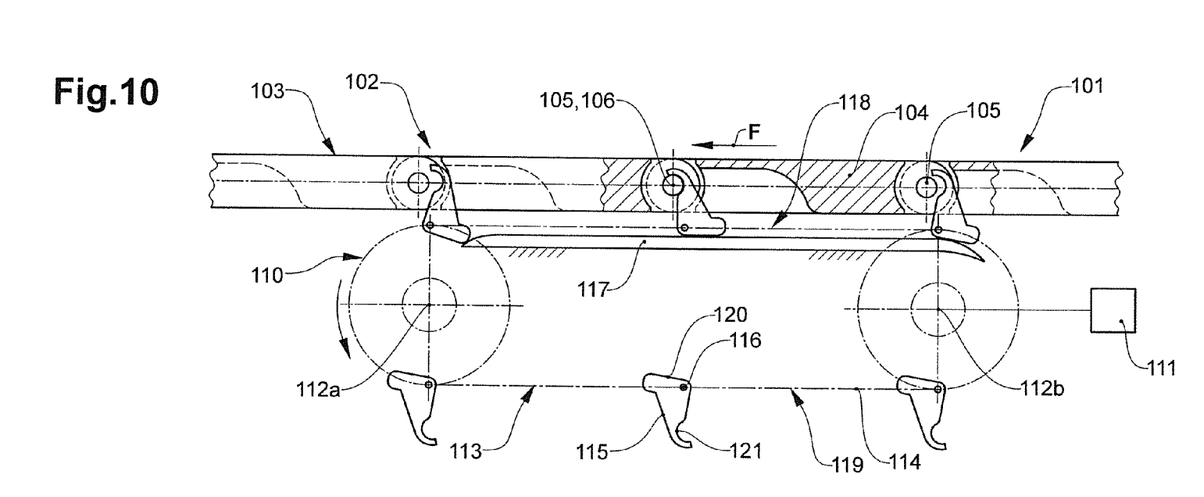
FIG. 10 is a cross-sectional view of a detail of a further embodiment of a conveying device with a drive device.
Figure 11:
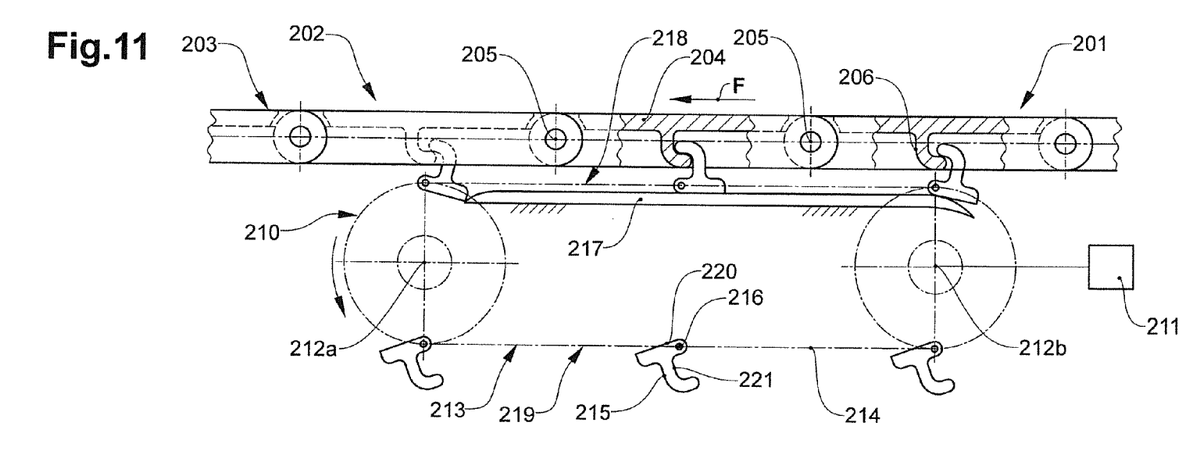
FIG. 11 is a cross-sectional view of a detail of a further embodiment of a conveying device with a drive device.

FIGS. 10 and 11 in each case show a further embodiment of the conveying device 101, 201 according to the invention. FIGS. 10 and 11 merely show a cross-sectional view of a detail from the region of the drive device 110, 210. Basically, the construction of the conveying device 101, 201 can correspond to the construction of the conveying device according to FIGS. 1-4 as well as 8-9, with the exception of the particular differentiating features represented in FIGS. 10 and 11.

FIGS. 10 and 11 show a detail of the conveying element 103, 203 from the region of the conveying section 102, 202. The conveying element 103, 203 is designed as a module belt chain which comprises a plurality of module belt links 104, 204, which are connected to one another via link pivots 105, 205. The conveying element 103, 203 includes contact elements 106, 206 which together with the engagement elements 115, 215 on the drive element 113, 213 form a drive engagement 113, 213.

The drive device 110, 210 is designed as an intermediate drive. The drive device 110, 210 includes two deflection pivots 112a, 112b; 212a, 212b, which run transversely to the conveying direction F and are spaced from one another in the conveying direction F. One of the deflection pivots 112b, 212b is driven via a drive motor 111, 211. However, the other deflection pivot 112a, 212a or both deflection pivots 112a, 112b; 212a, 212b can be driven in each case via a drive motor.

The drive device 110, 210 moreover includes a drive element 113, 213 that is led in a circulating manner around the two deflection pivots 112a, 112b; 212a, 212b. The drive element 113, 213 has a drive body 114, 214, via which the drive element 113, 213 is led in a circulating manner. The design of the drive body 114, 214 is only schematically represented in the figures. The drive body 114, 214 can, e.g., be a link chain or a belt. The drive body 114, 214 forms a drive section 118, 218 towards the conveying element 103, 203.

Hook-like engagement elements 115, 215, which are spaced from one another, are arranged on the outer periphery of the drive body 114, 214. The engagement elements 115, 215 are each fastened on the drive body 114, 214 via a pivot 116, 216. The engagement elements 115, 215 moreover include a support section 120, 220 that is arranged subsequently in the movement direction of the pivot 116, 216. The engagement elements 115, 215 moreover each include a recess 121, 221 for forming an engagement with a contact element 106, 206.

A guide rail 117, 217 is arranged in the region of the drive section 118, 218. The engagement elements 115, 215, as described in more detail hereinafter, are led in a sliding manner on the guide rail 117, 217 by way of the support section 120, 220.

Moreover, the engagement elements 115, 215 each include a recess 121, 221 for forming an engagement with contact elements 106, 206 on the conveying element 103, 203. The engagement and contact elements 115, 215; 106, 206 are thus designed, and arranged relative to one another in the drive unit 118, 218, such that the engagement elements 115, 215 engage over the contact elements 106, 206 towards the conveying element 103, 203. The engagement elements 115, 215 engage over the contact elements 106, 206 in a manner to permit no evasive movement of the conveying element 103, 203 to the top.

The pivotable mounting of the engagement elements 115, 215 on the drive body serves for pivoting the engagement elements 115, 215 towards the contact element 106, 206 for assuming the position engaging over the contact element 106, 206. The pivot position is thereby fixed via the guidance of the subsequent support section 120, 220, by the guide rail 117, 217.

The support section 120, 220 of the engagement element thus towards the end of the deflection from the return-side section 119, 219 into the conveying-side drive section 118, 218 forms a guide contact with the guide rail 117, 217. The guide rail 117, 217 at the beginning of the guide contact has a curvature that leads into the deflection. The curvature, along which the support section 120, 220 follows, effects the pivoting of the engagement element 115, 215 towards the contact element 106, 206.

A guide section, which runs in a straight line and along which the moved support section 120, 220 follows, follows subsequently to the arcuate section of the guide rail 117, 217. This ensures that the engagement element 115, 215 remains in the drive section 118, 218 in the engaged position and e.g. does not pivot out of this again.

The guide rail 117, 217 is moreover designed such that the guiding contact between the guide rail 117, 217 and the support section 120, 220 ends before the entry of the engagement element 115, 215 into the deflection from the conveying-side drive section 118, 218 into the return-side section 119, 219. The engagement elements 115, 215, which are then not guided before their deflection, on account of gravity, passively tilt rearwards counter to their movement direction about the pivot axis, before the entry into the deflection. The engaging-over or encompassing with the contact element 106, 206 is lifted by way of this. However, one can also envisage the tilt movement being actively activated by the guide rail 117, 217 by a guidance which reaches to the deflection.

This procedure is important, since the engagement elements 115, 215 on entry into the deflection may no longer be in an engaging-over position with the contact element 106, 206. The engagement element 115, 215 would otherwise exert a downward pull force onto the contact element 106, 206 and as a result onto the conveying element 103, 203.

In the embodiment according to FIG. 10, the contact elements 106 are formed by the link pivots 105 of the conveying element 103, which is present as a module belt chain. The hook-like engagement elements 115 form a recess 121, which is concave in cross section and complementary to the link pivot 105, which is designed in a round manner in cross section.

In the embodiment according to FIG. 11, the contact elements 206 are formed by hook-like elements, which are arranged between the link pivots 205 of the conveying element 203, which is present as a module belt chain.

The openings of the hook-like engagement elements 215 and of the hook-like contact elements 206 face one another in the drive section 218.

The invention claimed is:

1. A conveying device, comprising:
two side closure beams, said side closure beams being spaced from one another, run along a conveying direction, and laterally enclose the conveying device,
an extensively extended conveying element that is arranged in a circulating manner between the side closure beams and comprises an upper conveying section and a lower return section,
two head-ends that are spaced from one another in the conveying direction, wherein the conveying element is deflected in each case at the head-ends,
a support arrangement arranged between the side closure beams and the head-ends, for supporting the conveying section,
at least one drive device with at least one drive motor to drive the conveying element,
wherein the at least one drive device is arranged:
between both head-ends and spaced from the head-ends,
between the two side closure beams and
between the conveying section and the return section,
and the at least one drive device comprises a drive element that is driven by the at least one drive motor and that is arranged in a circulating manner about two deflection pivots that are spaced from one another in the conveying direction, and the drive element forms a contact fit with the conveying element to transmit a drive force onto the conveying element, and wherein the deflection pivots are rotatably mounted in holders and are positioned between, and spaced from, the side closure beams so as to extend over only a portion of a total distance between the side closure beams, and the deflection pivots are fastened on transverse beams via the holders and the transverse beams are connected to the side closure beams.

2. The conveying device according to claim 1, wherein the drive element forms a positive connection with the conveying element, for transmitting a drive force from the drive element onto the conveying element.

3. The conveying device according to claim 1, wherein the drive element forms an extensive contact fit with the conveying element, for the extensive transmission of the drive force and for the extensive support of the conveying element.

4. The conveying device according to claim 1, wherein the deflection of the drive element is spaced from the head-ends in each case.

5. The conveying device according to claim 1, wherein the drive element comprises engagement elements, which together with contact elements on the conveying element, form a contact fit, in particular an engagement.

6. The conveying device according to claim 5, wherein the engagement elements engage over the contact elements on the conveying element.

7. The conveying device according to claim 1, wherein the drive element is a link chain, in particular a module belt chain with a plurality of chain links, in particular module belt links, which are articulately connected to one another, and preferably at least individual chain links comprise engagement elements directed to the conveying element.

8. The conveying device according to claim 1, wherein the conveying element is a link chain, in particular a module belt chain with a plurality of chain links, in particular module belt links, which are articulately connected to one another, and preferably at least individual chain links comprise contact elements, which are directed to the drive element, for forming a contact fit, in particular an engagement, with the drive element, in particular with engagement elements of the drive element.

9. The conveying device according to claim 5, wherein the engagement and contact elements are prominences and/or recesses.

10. The conveying device according to claim 9, wherein the engagement or contact elements, which are designed as prominences, comprise a main body of a rubber-elastic material.

11. The conveying device according to claim 1, wherein the drive motor drives at least one of the deflection pivots.

12. The conveying device according to claim 11, wherein the drive motor with its motor shaft is arranged coaxially to the deflection pivot.

13. The conveying device according to claim 1, wherein a deflection pivot is arranged at least at one head-end, about which deflection pivot the conveying element is deflected, and the deflection pivot is driven by a drive motor, wherein the deflection pivot and the conveying element are arranged cooperating with one another such that the deflection pivot can transmit a drive force onto the conveying element.

14. The conveying device according to claim 1, wherein the drive device together with the transverse beams and longitudinal profiles of the side closure beams form an assembly group, wherein the longitudinal profiles with the transverse beams form a frame, and the drive device is arranged within this frame.

15. The conveying device according to claim 1, wherein the conveying device comprises:
two longitudinal profiles that are spaced from one another and which are part of the side closure beams, and wherein the transverse beams comprise two transverse beams, which are spaced from one another and which connect the longitudinal profiles to one another into a frame, and
wherein the drive device is arranged within the frame, wherein the , and the assembly group is installed into the conveying device via connection interfaces on the longitudinal profiles.

* * * * *